J. V. ROBINSON.
FLEXIBLE METAL TUBING.
APPLICATION FILED MAR. 8, 1913.
1,212,685.
Patented Jan. 16. 1917.
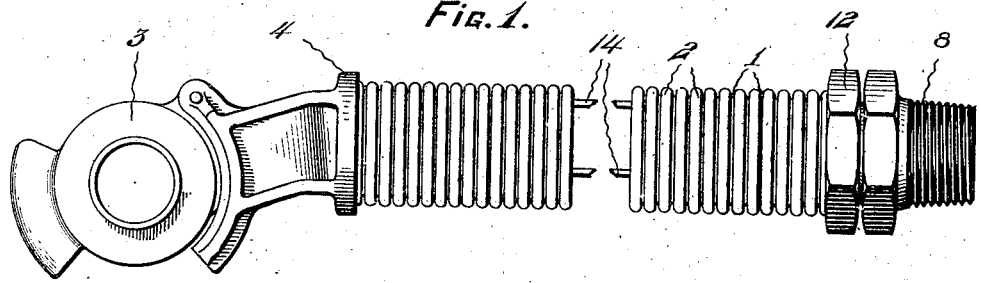
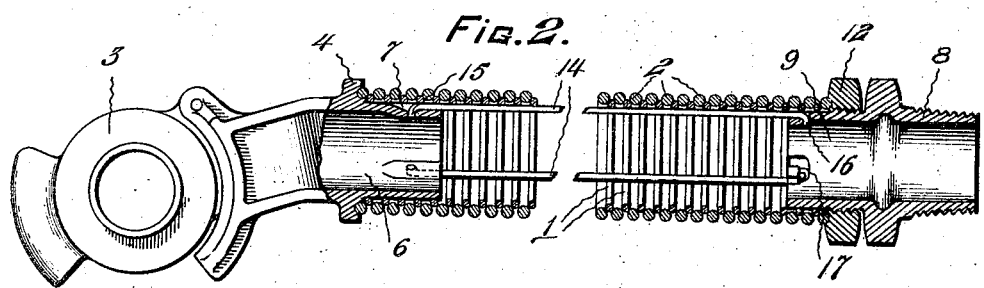
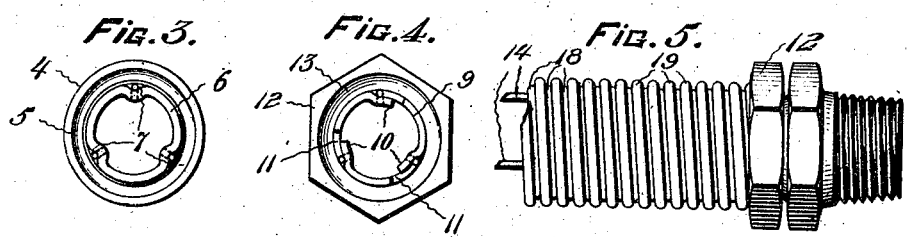
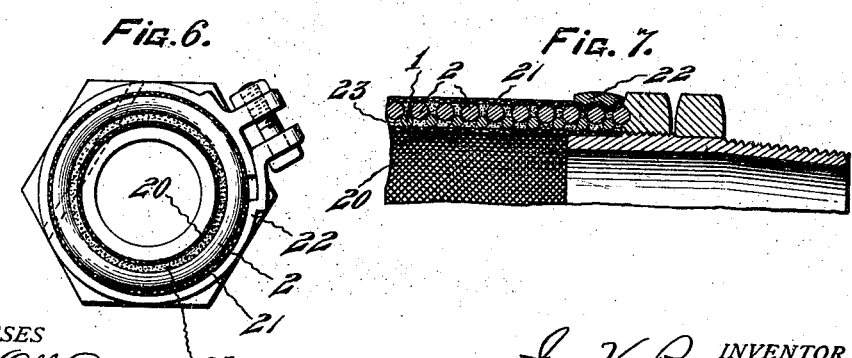
WITNESSES
INVENTOR
Jos. V. Robinson
Attorney

UNITED STATES PATENT OFFICE.

JOSEPH V. ROBINSON, OF WASHINGTON, DISTRICT OF COLUMBIA.

FLEXIBLE METAL TUBING.

1,212,685.  Specification of Letters Patent.  Patented Jan. 16, 1917.

Application filed March 8, 1913. Serial No. 753,085.

*To all whom it may concern:*

Be it known that I, JOSEPH V. ROBINSON, citizen of the United States, residing at Washington, in the District of Columbia, have invented certain new and useful Improvements in Flexible Metal Tubing, of which the following is a specification.

My invention relates to flexible tubing, and it consists in the constructions, combinations and arrangements herein described and claimed.

An object of my invention is to provide an improved flexible tube having great strength combined with uniform flexibility, and adapted to confine and convey gases and liquids efficiently under conditions impractical with existing types of hose.

A further object of my invention is to provide an improved flexible metal pipe especially adapted for advantageous use in place of the hose employed for connecting train-pipes, which is strong and durable and capable of remaining air tight throughout long continued service conditions of abrupt bending, contamination by oils and extreme changes of temperature.

In the accompanying drawings, forming a part of this application and in which similar reference symbols indicate corresponding parts in the several views: Figure 1 is a side elevation, illustrating one embodiment of my invention applied as a train-pipe hose; Fig. 2 is a similar view, showing the flexible metal pipe and screw nipple in axial section; Fig. 3 is an end view of the coupling nipple shown in Fig. 2; Fig. 4 is an end view of the screw nipple shown in Fig. 2; Fig. 5 is a detail side view of a modified construction; Fig. 6 is an end elevation, showing a modified construction provided with inner and outer envelops of wire netting, or other flexible material, and means for securely clamping it on a screw nipple, and Fig. 7 is a fragmentary axial section of the construction shown in Fig. 6.

Referring to the drawings, 1 and 2 indicate, respectively, inner and outer concentric series of independent annular sections, or rings, preferably formed of a metal or alloy, or other suitable hard material; the inner rings being shown of less thickness than those of the outer series and serving as a non-resilient packing for the outer rings.

The rings of each series interengage between those of the other along rolling line contacts; theoretically true contacts being readily insured, if desired, by rotating one of said ring series relative to the other, preferably in the presence of a fine abrasive material. This ground contact can be conveniently obtained by clamping the concentric ring series in their normal interengaged position about a rotatable mandrel provided with means, such as gripping edges or clamping devices, for rotating the inner ring series.

A coupling member 3 is provided with a collar 4 recessed at 5 to constitute a retaining seat for the end annular section 2 of the outer series, and with a thimble 6 adapted to fit snugly within the end of the inner ring section 1; said thimble being provided with peripheral recesses 7 having offset portions.

A screw nipple 8 for attachment to a train-pipe carries a thimble 9 adapted to fit snugly within the end of the inner ring series and having recessed, or depressed, portions 10 provided with bayonet slots 11; a nut 12 being adjustably threaded on said thimble and provided with a retaining seat 13 for engaging the adjacent end annular section 2 of the outer series.

A plurality of flexible, inextensible clamping members 14, such as wires or rods of suitable resilient metal, extend in the recesses 7 of the thimble 6 flush with the outer periphery of the latter, and are provided with bent ends 15 locked in the offset portions of said recesses 7 by the inner annular sections 1 fitted over said thimble; the other ends of said clamping members extending in the recesses 10 flush with the outer periphery of the screw thimble 9, and having bent portions 16 adapted to be detachably engaged by the bayonet slots 11 of said thimble. The bayonet slots 11 preferably terminate in axially inclined portions 17, into which the bent portions 16 of said clamping members are forced and locked by the action of the nut 12.

The above described construction can be conveniently assembled by inserting the clamping members 14 in the slots 7 of the thimble 6 with their free ends properly spaced, as by a collapsible core, and then sliding the interengaged inner and outer series of annular sections 1 and 2 over said clamping members 14 and thimble 6 until the end outer section 2 seats in the recess 5 of the collar 4. The thimble 9 is then fitted in the end of the inner ring series 1 and turned to engage the bent portions 16 of the clamping members in the bayonet slots 11; the nut 12 being finally adjusted to lock the clamping members in the bayonet slots, and clamp the annular sections in interengagement with the required pressure. This provides a novel and highly advantageous construction, in which the concentric annular sections are maintained in air-tight interengagement and positively confined against abrupt buckling or displacement by flexible, inextensible clamping members which extend axially in contact with the inner annular sections throughout the entire series of the latter; thereby providing a strong and durable flexible pipe especially adapted for use in connecting train-pipes.

In my improved construction, the ends of the axially-extending clamping rods 14 are rigidly clamped between the rings 1 and the nipples 6 and 9 fitted snugly therein, thereby causing those portions of said rods immediately beyond the ends of the thimbles to have a maximum rigidity and resistance to bending, which decreases gradually along the lengths of said rods from the clamped ends of the latter. This is of great practical value, since it efficiently prevents all danger of the injurious kinking occurring adjacent to the ends of the nipple thimbles in existing types of hose.

Fig. 5 illustrates a modification, in which inner and outer concentric spirals 18 and 19 are substituted for the ring series 1 and 2 of the construction shown in Figs. 1–4; the several annular sections or coils of each spiral interengaging between those of the other, and being maintained in position by the previously described clamping means.

Figs. 6 and 7 illustrate a modified construction, in which the concentric inner and outer ring series 1 and 2 are closely incased between inner and outer casings or tubes 20 and 21 of flexible, inextensible material, such as wire mesh; said flexible casings constituting clamping means for maintaining the series of annular sections 1 and 2 in interengagement. The casings 20 and 21 are firmly clamped to the thimbles of the coupler and screw nipples by split clamping rings 22, and are preferably filled with a combined packing and lubricant 23, such as graphite paste.

I have illustrated preferred and satisfactory constructions, but changes could be made within the spirit and scope of my invention.

I claim:

1. A flexible tube comprising a series of separately formed rings, arranged side by side in coaxial relation, each ring having a rolling contact with abutting rings, and flexible, inextensible, means holding the ring sections in contacting relation.

2. A flexible tube comprising a series of coaxially arranged separately formed rings, a second series of similar rings of different diameter than the rings in the first said series, the two series of rings being alternately arranged so that the members of one series are positioned between and in contact with members of the other series, and flexible, inextensible, means holding the rings of one series in contacting relation to those of the other series.

In testimony whereof I affix my signature in presence of two witnesses.

JOSEPH V. ROBINSON.

Witnesses:
  CHESTER A. BAILEY,
  MARTHA E. EVERETT.